(12) United States Patent
Young

(10) Patent No.: US 10,992,939 B2
(45) Date of Patent: Apr. 27, 2021

(54) DIRECTIONAL INTRA-PREDICTION CODING

(71) Applicant: GOOGLE LLC, Mountain View, CA (US)

(72) Inventor: Joseph Young, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 225 days.

(21) Appl. No.: 15/790,516

(22) Filed: Oct. 23, 2017

(65) Prior Publication Data

US 2019/0124339 A1  Apr. 25, 2019

(51) Int. Cl.
*H04N 19/159* (2014.01)
*H04N 19/117* (2014.01)
*H04N 19/176* (2014.01)

(52) U.S. Cl.
CPC ......... *H04N 19/159* (2014.11); *H04N 19/117* (2014.11); *H04N 19/176* (2014.11)

(58) Field of Classification Search
CPC ... H04N 19/159; H04N 19/176; H04N 19/117
See application file for complete search history.

(56) References Cited

U.S. PATENT DOCUMENTS

| | | | |
|---|---|---|---|
| 8,098,931 B2* | 1/2012 | Chen | H04N 7/0102 348/441 |
| 8,937,998 B2 | 1/2015 | Karczewicz | |
| 9,154,787 B2 | 10/2015 | Kumar et al. | |
| 9,225,986 B2 | 12/2015 | Bossen et al. | |
| 9,258,563 B2 | 2/2016 | Chong et al. | |
| 9,736,478 B2 | 8/2017 | Minezawa et al. | |
| 9,736,494 B2 | 8/2017 | Suzuki et al. | |
| 9,800,884 B2* | 10/2017 | Guo | H04N 19/46 |
| 9,906,788 B2* | 2/2018 | Lin | G06T 9/004 |
| 10,097,826 B2* | 10/2018 | Lin | G06T 9/004 |
| 10,225,578 B2 | 3/2019 | Young | |
| 10,506,256 B2 | 12/2019 | Young | |
| 2010/0142843 A1* | 6/2010 | Chen | H04N 7/0102 382/261 |

(Continued)

FOREIGN PATENT DOCUMENTS

WO  2011128023 A1  10/2011

OTHER PUBLICATIONS

Joshi et al, Novel inter and intra prediction tools under consideration for the emerging AV1 video codec, Proc. SPIE 10396, Applications of Digital Image Processing XL, 103960F (Sep. 19, 2017) doi: 10.1117/12.2274022 (Year: 2017).*

(Continued)

*Primary Examiner* — Boubacar Abdou Tchoussou
(74) *Attorney, Agent, or Firm* — Young Basile Hanlon & MacFarlane, P.C.

(57) ABSTRACT

Coding a current block using a directional intra-prediction mode is described. A filter to apply to reference pixels peripheral to the current block is determined using a prediction angle of the intra-prediction mode and a size of the current block. The reference pixels are filtered using the filter to generate modified reference pixels, and a prediction block is generated for the current block using the intra-prediction mode and the modified reference pixels.

19 Claims, 10 Drawing Sheets

(56) References Cited

U.S. PATENT DOCUMENTS

| | | | |
|---|---|---|---|
| 2012/0082224 A1* | 4/2012 | Van Der Auwera | ......................... H04N 19/176 375/240.12 |
| 2012/0147955 A1 | 6/2012 | Budagavi | |
| 2013/0128961 A1* | 5/2013 | Kim | ...................... H04N 19/82 375/240.03 |
| 2014/0185680 A1* | 7/2014 | Li | ...................... H04N 19/154 375/240.16 |
| 2015/0003524 A1* | 1/2015 | Yamamoto | .......... H04N 19/587 375/240.12 |
| 2016/0044336 A1 | 2/2016 | Lee et al. | |
| 2016/0241851 A1* | 8/2016 | Lin | ......................... G06T 9/004 |
| 2018/0131932 A1* | 5/2018 | Lin | ......................... G06T 9/004 |
| 2019/0068967 A1* | 2/2019 | Ikai | ..................... H04N 19/513 |
| 2019/0068989 A1* | 2/2019 | Lee | ...................... H04N 19/159 |
| 2019/0281295 A1* | 9/2019 | Ichigaya | ............. H04N 19/176 |

OTHER PUBLICATIONS

Bankoski, et al., "Technical Overview of VP8, An Open Source Video Codec for the Web", Jul. 11, 2011, 6 pp.

Bankoski et al., "VP8 Data Format and Decoding Guide", Independent Submission RFC 6389, Nov. 2011, 305 pp.

Bankoski et al., "VP8 Data Format and Decoding Guide draft-bankoski-vp8-bitstream-02", Network Working Group, Internet-Draft, May 18, 2011, 288 pp.

Series H: Audiovisual and Multimedia Systems, Coding of moving video: Implementors Guide for H.264: Advanced video coding for generic audiovisual services, International Telecommunication Union, Jul. 30, 2010, 15 pp.

"Introduction to Video Coding Part 1: Transform Coding", Mozilla, Mar. 2012, 171 pp.

"Overview VP7 Data Format and Decoder", Version 1.5, On2 Technologies, Inc., Mar. 28, 2005, 65 pp.

Series H: Audiovisual and Multimedia Systems, Infrastructure of audiovisual services—Coding of moving video, Advanced video coding for generic audiovisual services, International Telecommunication Union, Version 11, Mar. 2009. 670 pp.

Series H: Audiovisual and Multimedia Systems, Infrastructure of audiovisual services—Coding of moving video, Advanced video coding for generic audiovisual services, International Telecommunication Union, Version 12, Mar. 2010, 676 pp.

Series H: Audiovisual and Multimedia Systems, Infrastructure of audiovisual services—Coding of moving video, Amendment 2: New profiles for professional applications, International Telecommunication Union, Apr. 2007, 75 pp.

Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.

Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.

Series H: Audiovisual and Multimedia Systems, Infrastructure of audiovisual services—Coding of moving video, Advanced video coding for generic audiovisual services, Version 1, International Telecommunication Union, May 2003, 282 pp.

Series H: Audiovisual and Multimedia Systems, Infrastructure of audiovisual services—Coding of moving video, Advanced video coding for generic audiovisual services, Version 3, International Telecommunication Union, Mar. 2005, 343 pp.

"VP6 Bitstream and Decoder Specification", Version 1.02, On2 Technologies, Inc., Aug. 17, 2006, 88 pp.

"VP6 Bitstream and Decoder Specification", Version 1.03, On2 Technologies, Inc., Oct. 29, 2007, 95 pp.

"VP8 Data Format and Decoding Guide, WebM Project", Google On2, Dec. 1, 2010, 103 pp.

International Search Report and Written Opinion in PCT/US2018/018309, dated Jul. 19, 2018, 22 pgs.

Yunfei Zheng et al., "CE13: Mode Dependent Hybrid Intra Smoothing", Joint Video Collaborative Team on Video Coding (JCT-VC) of ITU-T SG16 WP3 and ISO/IEC JTC1/SC29/WG11, 4th Meeting, Daegu, South Korea, Jan. 20-28, 2011, url: http://wftp3.itu.int/av-arch/jctvc-site/, document No. JCTVC-D282 (Jan. 16, 2011), 5 pgs.

S. Matsuo et al., "Modification of angular intra prediction", Joint Collaborative Team on Video Coding (JCT-VC) of ITU-T SG16 WP3 and ISO/IEC JTC1/SC29/WG11, 7th Meeting, Geneva, Switzerland, Nov. 21-30, 2011, url: http://wftp3.itu.int/av-arch/jctvc-site/, document No. JCTVC-G350 (Nov. 8, 2011), 5 pgs.

* cited by examiner

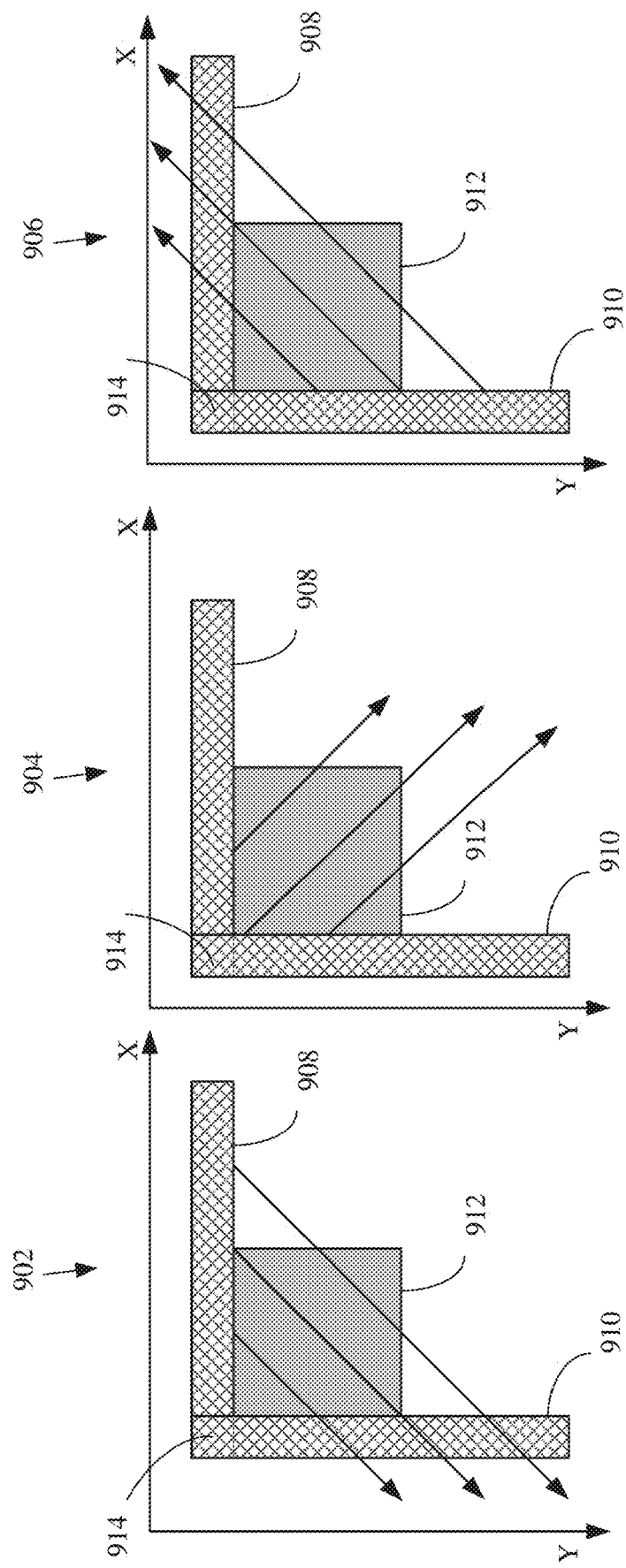

DIRECTIONAL INTRA-PREDICTION CODING

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission or storage of the video data. Various approaches have been proposed to reduce the amount of data in video streams, including compression and other encoding techniques.

Encoding based on spatial similarities may be performed by breaking a frame or image into blocks that are predicted based on other blocks within the same frame or image. Differences (i.e., residual errors) between blocks and prediction blocks are compressed and encoded in a bitstream. A decoder uses the differences and the reference frames to reconstruct the frames or images.

SUMMARY

Disclosed herein are aspects, features, elements, and implementations for encoding and decoding blocks using directional intra prediction.

One aspect of the disclosed implementations is a method for coding a current block using an intra-prediction mode, the intra-prediction mode including a prediction angle and using pixels peripheral to the current block. The method includes determining, using the prediction angle and a size of the current block, a filter to apply to reference pixels peripheral to the current block, filtering, using the filter, the reference pixels to generate modified reference pixels, and generating a prediction block for the current block using the intra-prediction mode and the modified reference pixels.

Another aspect is an apparatus, including a memory and a processor, for encoding or decoding a current block using an intra-prediction mode. The intra-prediction mode includes a prediction angle. The processor is configured to execute instructions stored in the memory to determine, using the prediction angle and a size of the current block, a filter to apply to reference pixels peripheral to the current block, filter, using the filter, the reference pixels to generate modified reference pixels, and generate a prediction block for the current block using the intra-prediction mode and the modified reference pixels.

Another aspect is an apparatus, including a memory and a processor, for encoding or decoding a current block of a current tile using an intra-prediction mode. The processor is configured to execute instructions stored in the memory to determine a first filter using a first angle delta between the prediction angle and a first line parallel to a first edge of the current block and using a size of the current block, determine a second filter using a second angle delta between the prediction angle and a second line parallel to a second edge of the current block that is orthogonal to the first edge, filter, using the first filter, first pixels of reference pixels peripheral to the current block that are located in one of a row or a column adjacent to the current block to generate first modified reference pixels, filter, using the second filter, second pixels of reference pixels peripheral to the current block that are located in the other of the row or the column adjacent to the current block to generate second modified reference pixels, and generate a prediction block for the current block using the intra-prediction mode, the first modified reference pixels, and the second modified reference pixels.

These and other aspects of the present disclosure are disclosed in the following detailed description of the embodiments, the appended claims and the accompanying figures.

BRIEF DESCRIPTION OF THE DRAWINGS

The description herein makes reference to the accompanying drawings wherein like reference numerals refer to like parts throughout the several views.

FIGS. 9A to 9C are diagrams of directional intra-prediction modes according to implementations of this disclosure.

DETAILED DESCRIPTION

Figure 1:
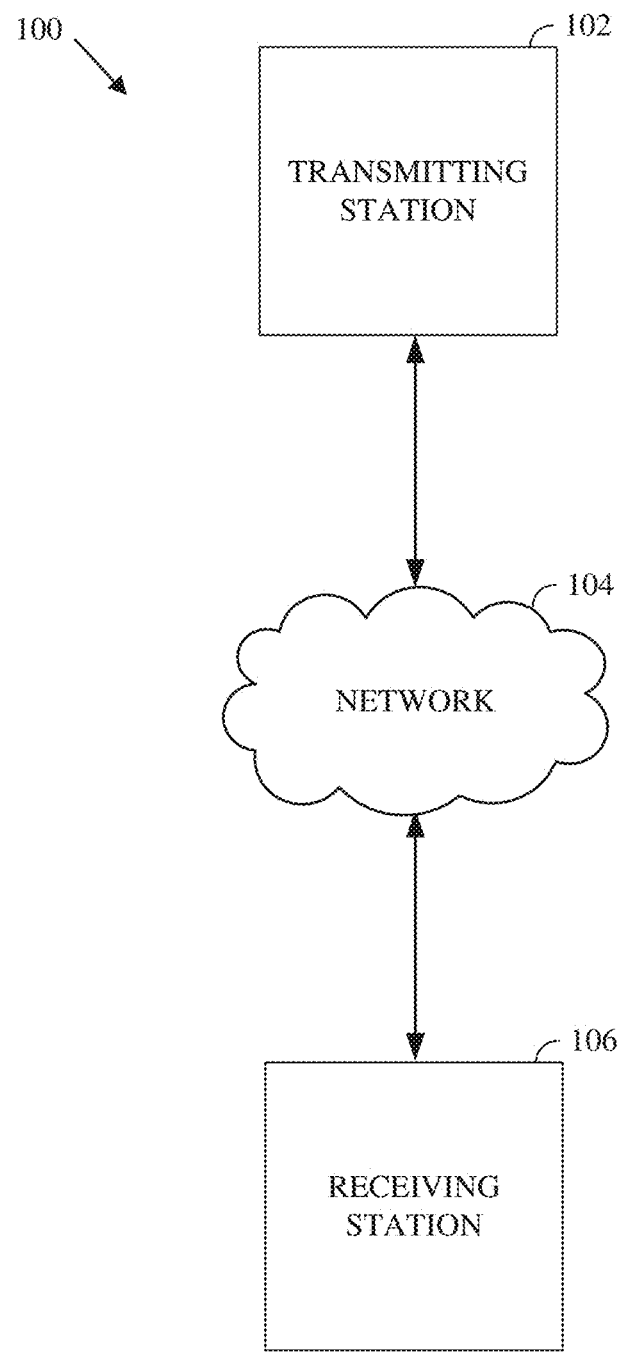
FIG. 1 is a schematic of a video encoding and decoding system.

As mentioned above, compression schemes related to coding video streams may include breaking images into blocks and generating a digital video output bitstream (i.e., an encoded bitstream) using one or more techniques to limit the information included in the output bitstream. A received bitstream can be decoded to re-create the blocks and the source images from the limited information. Encoding a video stream, or a portion thereof, such as a frame or a block, can include using spatial similarities in the video stream to improve coding efficiency. For example, a current block of a video stream may be encoded based on identifying a difference (residual) between the previously coded pixel values, or between a combination of previously coded pixel values, and those in the current block.

Encoding using spatial similarities can be known as intra prediction. Intra prediction attempts to predict the pixel values of a current block of a frame of a video stream using pixels peripheral to the current block; that is, using pixels that are in the same frame as the current block but that are outside the boundaries of the current block. Intra prediction can be performed along a direction of prediction, referred to herein as prediction angle, where each direction can correspond to an intra-prediction mode. An intra-prediction mode can use pixels peripheral to the current block being predicted. Pixels peripheral to the current block are pixels outside the current block. Pixels peripheral to the current block may be pixels that contact a boundary of the current block. The intra-prediction mode can be signalled by an encoder to a decoder.

Many different intra-prediction modes can be supported. Some intra-prediction modes use a single value for all pixels within the prediction block generated using at least one of the peripheral pixels. Others are referred to as directional intra-prediction modes, which each have a corresponding prediction angle. Intra-prediction modes can include, for example, horizontal intra-prediction mode, vertical intra-prediction mode, and various other directional intra-prediction modes. As such, the prediction angle can be any angle between 0 and 360 degrees. In some implementations, the prediction angle can be any angle between 0 and 270 degrees. Available prediction angles can also be a subset of all possible prediction angles. For example, a codec can have available prediction modes corresponding to 50 to 60 prediction angles between 0 and 360 degrees.

Various directional intra-prediction modes can be used to propagate pixel values from previously-coded blocks along an angular line (including horizontal, vertical, and directions offset from the horizontal and/or the vertical) to predict a block. That is, the current block can be predicted by projecting reference pixels from peripheral pixels to form a prediction block. The peripheral pixels can include pixels to the left of and above (i.e., top) boundaries of the current block, in a certain angle or direction that can be offset from the horizontal and the vertical lines. The reference pixels can be, for example, actual pixel values of the peripheral pixels or average pixel values (such as weighted average) of some of the peripheral pixels, which are propagated in angular directions to form the prediction block. The peripheral pixels can be combined in other ways to generate the reference pixels.

FIGS. 9A to 9C are diagrams of directional intra-prediction modes according to implementations of this disclosure. Directional intra-prediction modes may also be referred to as directional prediction modes herein. A directional prediction mode 902 illustrates an intra-prediction mode having a prediction angle between 0 and 90 degrees. Such intra-prediction modes may be referred to as belonging to Zone 1. A directional prediction mode 904 illustrates an intra-prediction mode having a prediction angle between 90 and 180 degrees. Such intra-prediction modes may be referred to as belonging to Zone 2. A directional prediction mode 906 illustrates an intralprediction mode having a prediction angle between 90 and 180 degrees. Such intra-prediction modes may be referred to as belonging to Zone 3. Each of the illustrated directional prediction modes 902-906 may be used to generate a prediction block having dimensions conforming to a current block 912.

FIGS. 9A to 9C also illustrate first pixels 908 in a row above the current block and second pixels 910 in a column to the left of the current block. A top-left pixel 914 is also illustrated. The first pixels 908, the second pixels 910, and the top-left pixel 914 can be used to generate the prediction block. In some implementations, directional predictions in Zone 1 (i.e., intra-prediction modes having prediction angles between 0 and 90) use the first pixels 908 but may not use the second pixels 910 to generate the prediction block; directional predictions in Zone 2 (i.e., intra-prediction modes having prediction angles between 90 and 180) use the first pixels 908, the second pixels 910, and the top-left pixel 914 to generate the prediction block; and directional predictions in Zone 3 (i.e., intra-prediction modes having prediction angles between 180 and 270) use the second pixels 910 but may not use the first pixels 908 to generate the prediction block.

Figures 10A, 10B:
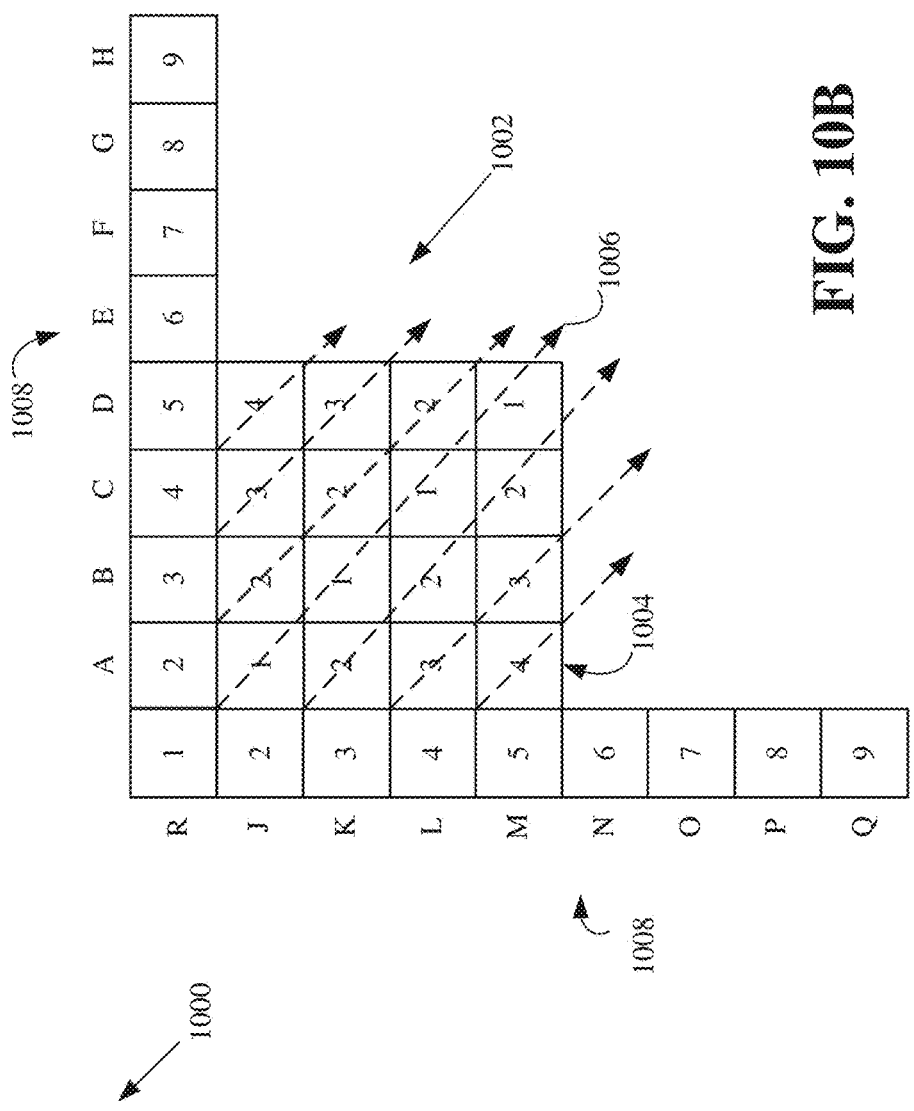
FIG. 10A is a diagram of an intra-prediction mode having a 90-degree prediction angle according to implementations of this disclosure.
FIG. 10B is a diagram of an intra-prediction mode having a 135-degree prediction angle according to implementations of this disclosure.

FIG. 10A is a diagram of an intra-prediction mode having a 90-degree prediction angle according to implementations of this disclosure. FIG. 10A illustrates generating a prediction block 1000 for a 4×4 block to be predicted (also called a current block) and corresponds to a directional prediction in Zone 2 (i.e., the directional prediction mode 904) as described with regards to FIG. 9B. The intra-prediction mode of FIG. 10A propagates peripheral pixels A through D down the columns of the prediction block 1000 such that each pixel in a column has its value set equal to that of the adjacent peripheral pixel A through D in the direction of the arrows.

FIG. 10B is a diagram of an intra-prediction mode having a 135-degree prediction angle according to implementations of this disclosure. FIG. 10B illustrates generating a prediction block 1002 for a 4×4 current block and corresponds to a directional prediction in Zone 2 as described with regards to FIG. 9B. The intra-prediction mode of FIG. 10B propagates peripheral pixel values along a 135-degree line (i.e., lines 1006) to the right and down to form the prediction block 1002. The peripheral pixel values can include, for example, some of peripheral pixels 1008 (i.e., pixels A through R) from blocks adjacent to the 4×4 current block of a frame to form the prediction block 1002 for the current block. Although the 135-degree intra-prediction mode in FIG. 10B is illustrated using the pixel values of the peripheral pixels 1008 to generate the prediction block 1002, for example, a linear combination (e.g., weighted average) of some (e.g., two, three, or more) of the peripheral pixels can be used to predict pixel values of the prediction block 1002 along lines extending through the block. For example, the pixel value that is propagated along one of the lines 1006 for the pixel location 1004 can be formed from an (e.g., weighted) average of pixel values K, L, and M.

The pixels of some video signals (e.g., signals of a high definition video or a 4K video) have relatively smooth gradients. As such, these video signals may not include many high frequency components. Rather, low frequency components mainly constitute such video signals. Intra-prediction modes having sharp prediction angles can result in higher frequencies in the prediction signal that, in turn, can result in high frequency distortions.

Implementations of this disclosure can improve video compression and/or reduce distortions using intra-prediction edge filtering. As indicated above, an intra-prediction mode uses pixels peripheral to the current block. Intra-prediction edge filtering can eliminate distortions by applying (e.g., low-pass) filters to at least some of the pixels peripheral to the current block, resulting in modified pixels, and using the modified pixels to generate a prediction block.

Details are described herein after first describing an environment in which the intra-prediction edge filtering disclosed herein may be implemented.

FIG. 1 is a schematic of a video encoding and decoding system 100. A transmitting station 102 can be, for example, a computer having an internal configuration of hardware such as that described in FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102 and the encoded video stream can be decoded in the receiving station 106. The network 104 can be, for example, the Internet. The network 104 can also be a local area network (LAN), wide area network (WAN), virtual private network (VPN), cellular telephone network or any other means of transferring the video stream from the transmitting station 102 to, in this example, the receiving station 106.

Figure 2:
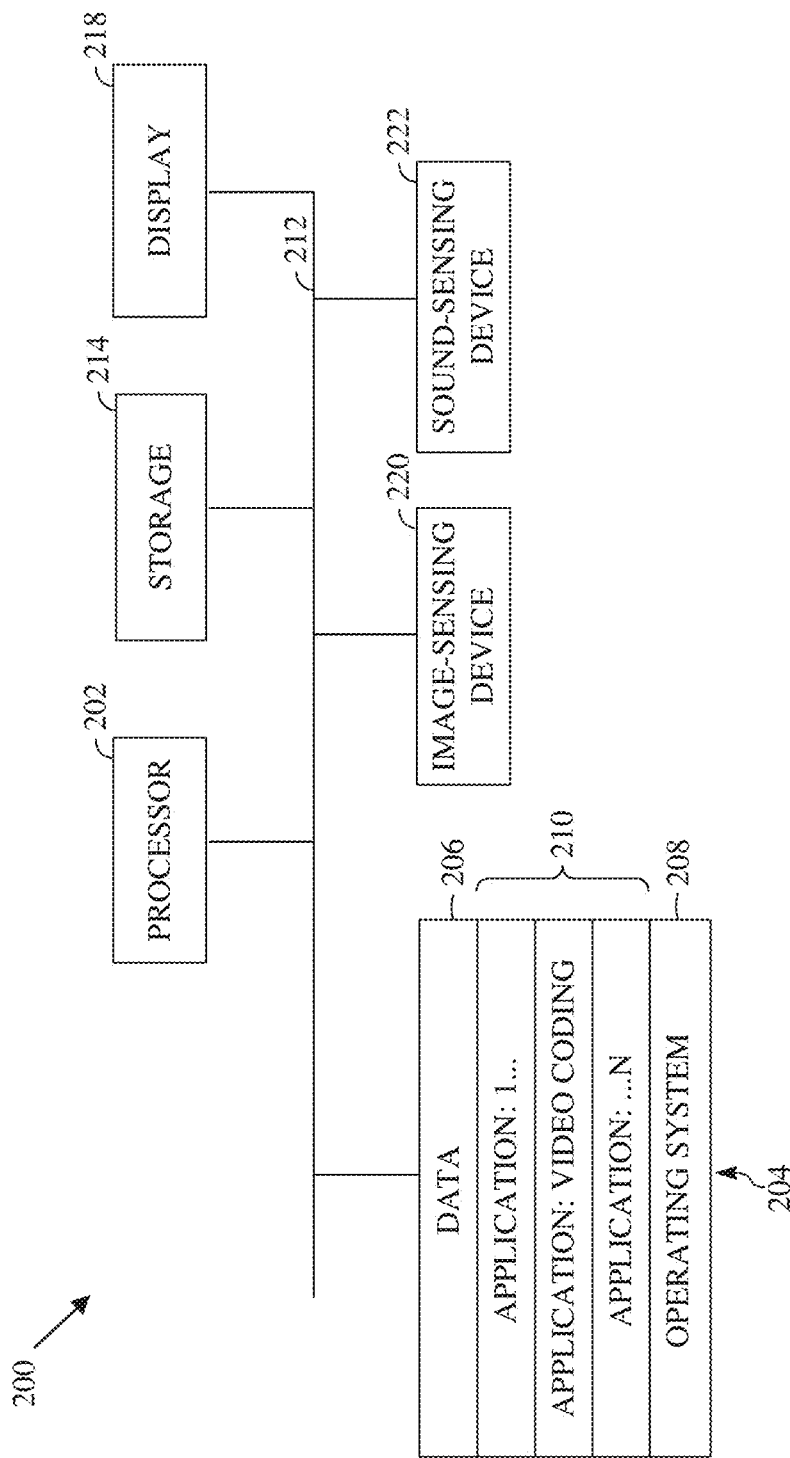
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used, e.g., a Hyper-Text Transfer Protocol (HTTP)-based video streaming protocol.

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits its own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of a single computing device, for example, a mobile phone, a tablet computer, a laptop computer, a notebook computer, a desktop computer, and the like.

A CPU 202 in the computing device 200 can be a central processing unit. Alternatively, the CPU 202 can be any other type of device, or multiple devices, capable of manipulating or processing information now-existing or hereafter developed. Although the disclosed implementations can be practiced with a single processor as shown, e.g., the CPU 202, advantages in speed and efficiency can be achieved using more than one processor.

A memory 204 in the computing device 200 can be a read-only memory (ROM) device or a random access memory (RAM) device in an implementation. Any other suitable type of storage device can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described here. For example, the application programs 210 can include applications 1 through N, which further include a video coding application that performs the methods described here. The computing device 200 can also include a secondary storage 214, which can, for example, be a memory card used with a computing device 200 that is mobile. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display or light emitting diode (LED) display, such as an organic LED (OLED) display.

The computing device 200 can also include or be in communication with an image-sensing device 220, for example a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into a single unit, other configurations can be utilized. The operations of the CPU 202 can be distributed across multiple machines (each machine having one or more processors) that can be coupled directly or across a local area or other network. The memory 204 can be distributed across multiple machines such as a network-based memory or memory in multiple machines performing the operations of the computing device 200. Although depicted here as a single bus, the bus 212 of the computing device 200 can be composed of multiple buses. Further, the secondary storage 214 can be directly coupled to the other components of the computing device 200 or can be accessed via a network and can comprise a single integrated unit such as a memory card or multiple units such as multiple memory cards. The computing device 200 can thus be implemented in a wide variety of configurations.

Figure 3:
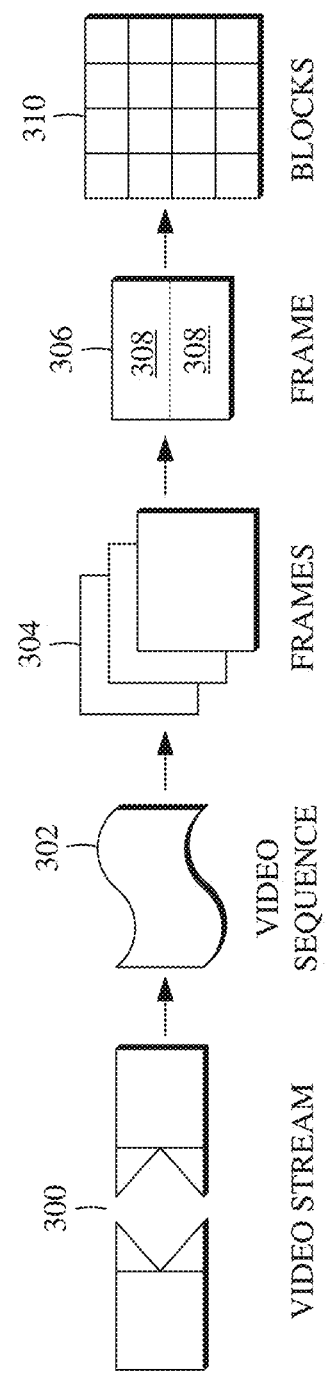
FIG. 3 is a diagram of a video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, e.g., a frame 306. At the next level, the frame 306 can be divided into a series of segments 308 or planes. The segments 308 can be subsets of frames that permit parallel processing, for example. The segments 308 can also be subsets of frames that can separate the video data into separate colors. For example, the frame 306 of color video data can include a luminance plane and two chrominance planes. The segments 308 may be sampled at different resolutions.

Whether or not the frame 306 is divided into the segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels or larger.

Figure 4:
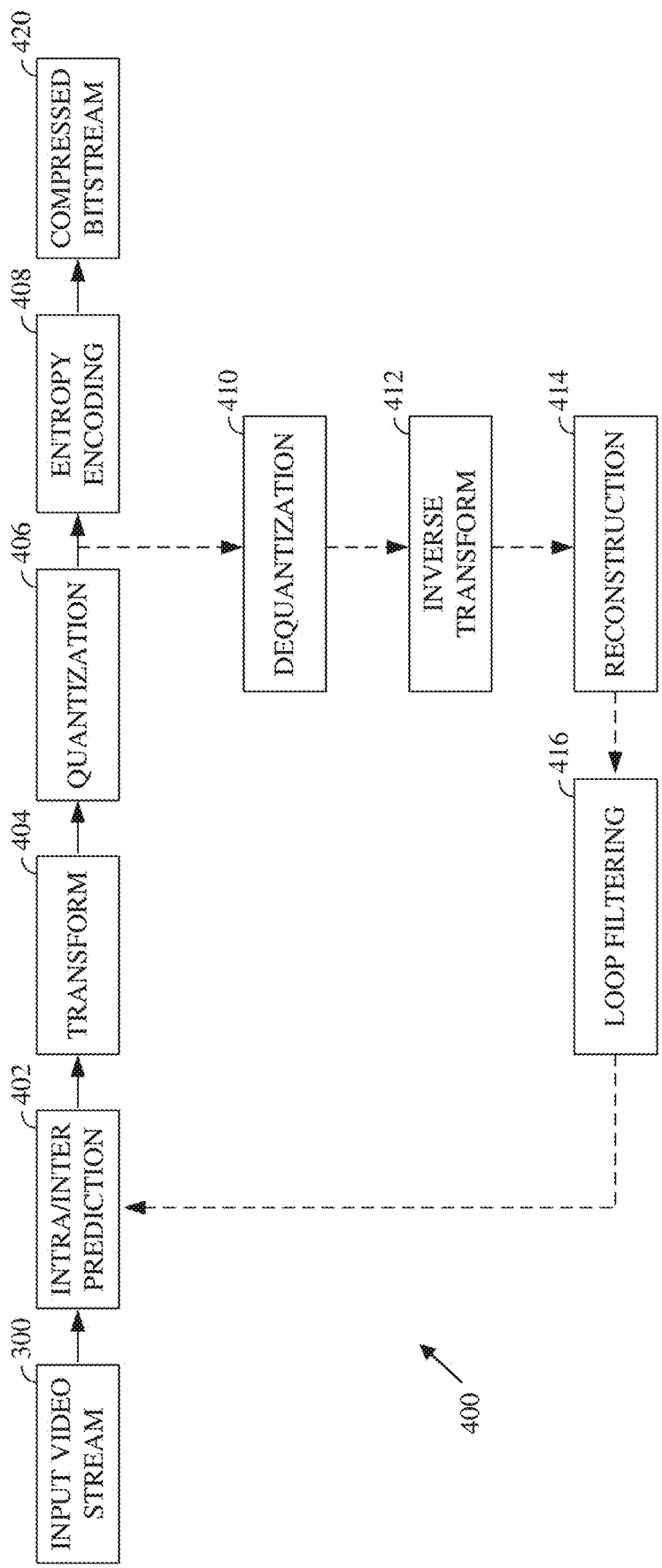
FIG. 4 is a block diagram of an encoder according to implementations of this disclosure.

FIG. 4 is a block diagram of an encoder 400 according to implementations of this disclosure. The encoder 400 can be implemented, as described above, in the transmitting station 102 such as by providing a computer software program stored in memory, for example, the memory 204. The computer software program can include machine instructions that, when executed by a processor such as the CPU 202, cause the transmitting station 102 to encode video data in the manner described herein. The encoder 400 can also be implemented as specialized hardware included in, for example, the transmitting station 102. The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, the frame 306 can be processed in units of blocks. At the intra/inter prediction stage 402, a block can be encoded using intra-frame prediction (also called intra-prediction) or inter-frame prediction (also called inter-prediction), or a combination of both. In any case, a prediction block can be formed. In the case of intra-prediction, all or a part of a prediction block may be formed from samples in the current frame that have been previously encoded and reconstructed. In the case of inter-prediction, all or part of a prediction block may be formed from samples in one or more previously constructed reference frames determined using motion vectors.

Next, still referring to FIG. 4, the prediction block can be subtracted from the current block at the intra/inter prediction stage 402 to produce a residual block (also called a residual). The transform stage 404 transforms the residual into transform coefficients in, for example, the frequency domain using block-based transforms. Such block-based transforms include, for example, the Discrete Cosine Transform (DCT) and the Asymmetric Discrete Sine Transform (ADST). Other block-based transforms are possible. Further, combinations of different transforms may be applied to a single residual. In one example of application of a transform, the DCT transforms the residual block into the frequency domain where the transform coefficient values are based on spatial frequency. The lowest frequency (DC) coefficient at the top-left of the matrix and the highest frequency coefficient at the bottom-right of the matrix. It is worth noting that the size of a prediction block, and hence the resulting residual block, may be different from the size of the transform block. For example, the prediction block may be split into smaller blocks to which separate transforms are applied.

The quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 408. Entropy coding may be performed using any number of techniques, including token and binary trees. The entropy-encoded coefficients, together with other information used to decode the block, which may include for example the type of prediction used, transform type, motion vectors and quantizer value, are then output to the compressed bitstream 420. The information to decode the block may be entropy coded into block, frame, slice and/or section headers within the compressed bitstream 420. The compressed bitstream 420 can also be referred to as an encoded video stream or encoded video bitstream, and the terms will be used interchangeably herein.

The reconstruction path in FIG. 4 (shown by the dotted connection lines) can be used to ensure that both the encoder 400 and a decoder 500 (described below) use the same reference frames and blocks to decode the compressed bitstream 420. The reconstruction path performs functions that are similar to functions that take place during the decoding process that are discussed in more detail below, including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. For example, a non-transform based encoder 400 can quantize the residual signal directly without the transform stage 404 for certain blocks or frames. In another implementation, an encoder 400 can have the quantization stage 406 and the dequantization stage 410 combined into a single stage.

Figure 5:
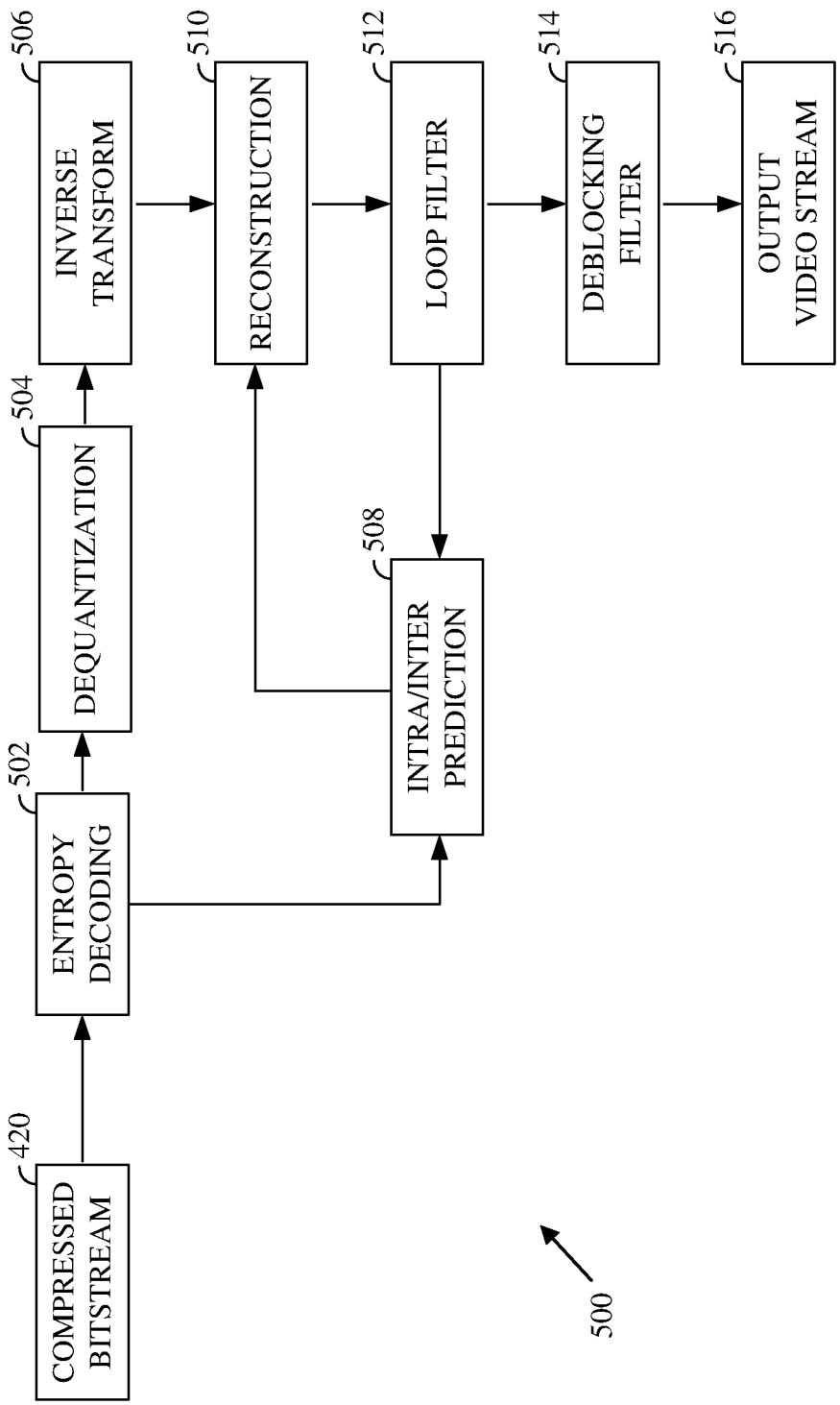
FIG. 5 is a block diagram of a decoder according to implementations of this disclosure.

FIG. 5 is a block diagram of a decoder 500 according to implementations of this disclosure. The decoder 500 can be implemented in the receiving station 106, for example, by providing a computer software program stored in the memory 204. The computer software program can include machine instructions that, when executed by a processor such as the CPU 202, cause the receiving station 106 to decode video data in the manner described herein. The decoder 500 can also be implemented in hardware included in, for example, the transmitting station 102 or the receiving station 106. The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/ inter-prediction stage 508, a reconstruction stage 510, a loop filtering stage 512 and a deblocking filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients using the selected transform type to produce a derivative residual that can be identical to that created by the inverse transform stage 412 in the encoder 400. Using header information decoded from the compressed bitstream 420, the decoder 500 can use the intra/inter-prediction stage 508 to create the same prediction block as was created in the encoder 400, e.g., at the intra/inter prediction stage 402. At the reconstruction stage 510, the prediction block can be added to the derivative residual to create a reconstructed block. The loop filtering stage 512 can be applied to the reconstructed block to reduce blocking artifacts. Other filtering can be applied to the reconstructed block. In this example, the deblocking filtering stage 514 is applied to the reconstructed block to reduce blocking distortion, and the result is output as an output video stream 516. The output video stream 516 can also be referred to as a decoded video stream, and the terms will be used interchangeably herein.

Other variations of the decoder 500 can be used to decode the compressed bitstream 420. For example, the decoder 500 can produce the output video stream 516 without the deblocking filtering stage 514. In some implementations of the decoder 500, the deblocking filtering stage 514 is applied before the loop filtering stage 512. Additionally, or alternatively, the encoder 400 includes a deblocking filtering stage in addition to the loop filtering stage 416.

Figure 6:
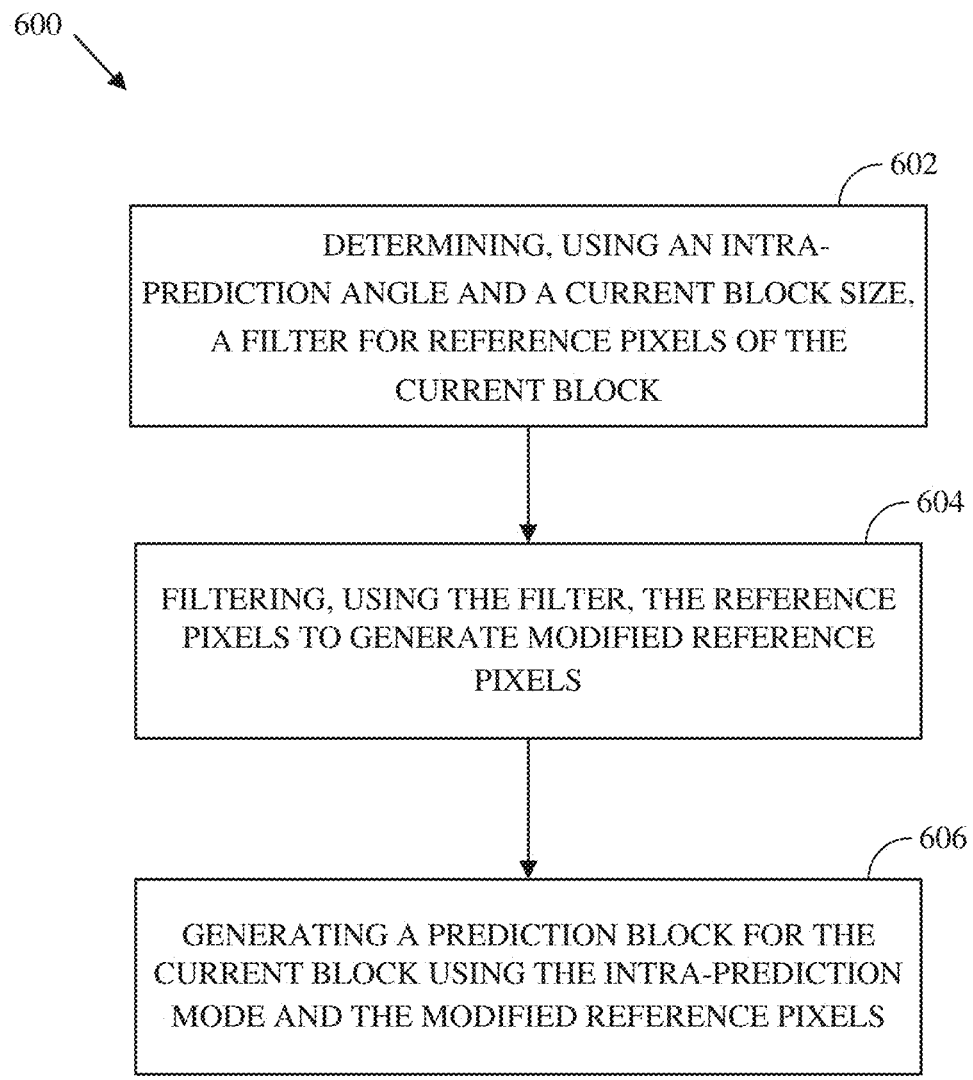
FIG. 6 is a flowchart diagram of a process for coding a current block using an intra-prediction mode according to an implementation of this disclosure.

FIG. 6 is a flowchart diagram of a process 600 for coding a current block using an intra-prediction mode according to an implementation of this disclosure. In these examples, the intra-prediction mode has a corresponding prediction angle and uses pixels peripheral to the current block (e.g., a directional intra-prediction mode is used). The pixels peripheral to the current block can be previously predicted pixels in the same video frame as the current block.

The process 600 can be implemented, for example, as a software program that can be executed by computing devices such as the transmitting station 102 or the receiving station 106. The software program can include machine-readable instructions that can be stored in a memory such as the memory 204 or the secondary storage 214, and that can be executed by a processor, such as CPU 202, to cause the computing device to perform the process 600. The process 600 can be implemented in an encoder, a decoder, or both an encoder and a decoder. In at least some implementations, the process 600 can be performed in whole or in part by the intra/inter prediction stage 402 of the encoder 400 of FIG. 4. In other implementations, the process 600 can be performed in whole or in part by the intra/inter-prediction stage 508 of the decoder 500 of FIG. 5.

The process 600 can be implemented using specialized hardware or firmware. Some computing devices can have multiple memories, multiple processors, or both. The steps or operations of the process 600 can be distributed using different processors, memories, or both. Use of the terms "processor" or "memory" in the singular encompasses computing devices that have one processor or one memory as well as devices that have multiple processors or multiple memories that can be used in the performance of some or all of the recited steps.

At 602, the process 600 determines, using an intra-prediction angle and a current block size, a filter to apply to the reference pixels of the current block. The reference pixels of the current block may be those indicated by the intra-prediction mode for use in generating a prediction block. The reference pixels may be at least some of the pixels peripheral to the current block as described with reference to FIGS. 9A-10B. The process 600 can determine the filter as described with respect to FIGS. 7 and 8.

Figure 7:
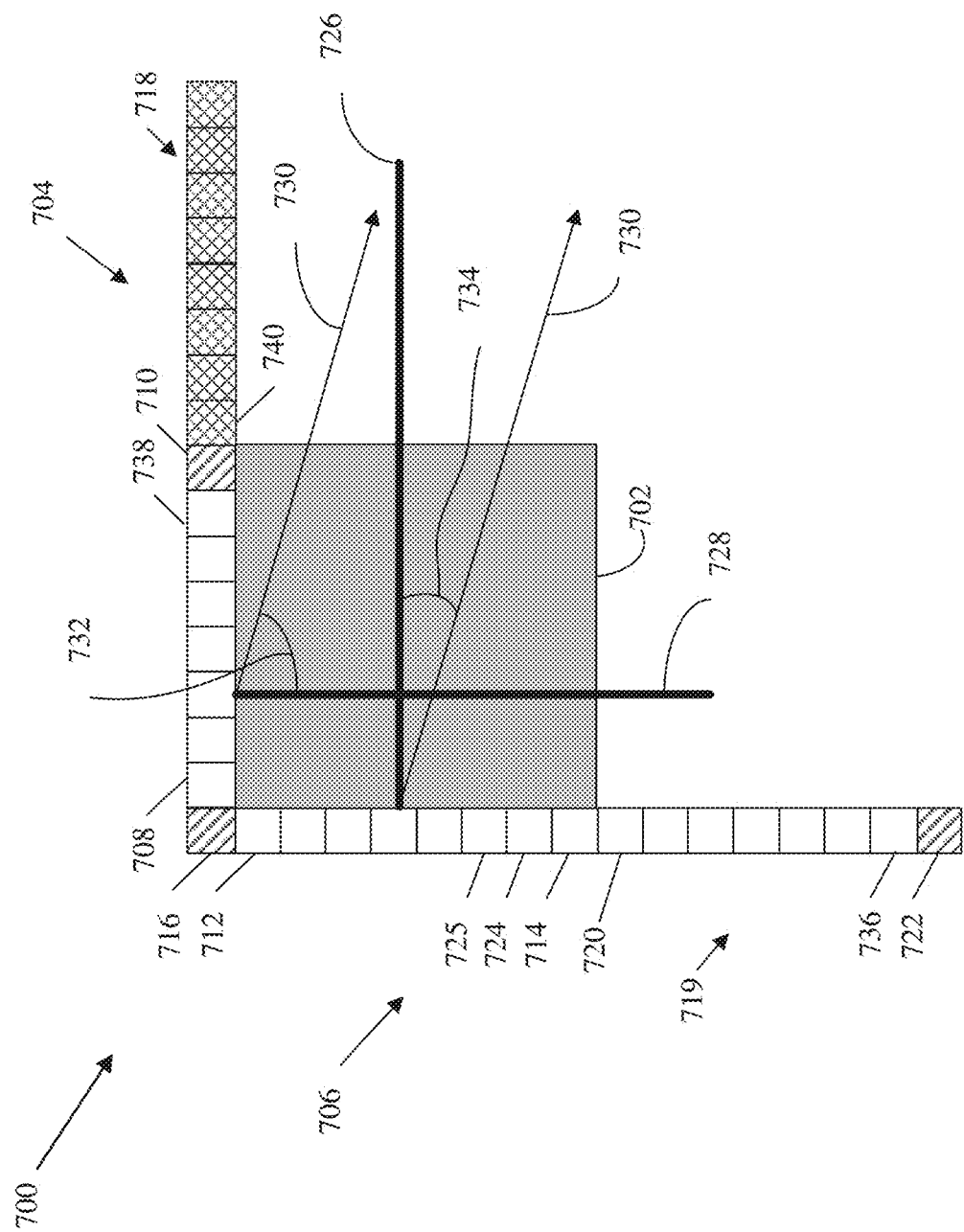
FIG. 7 is a diagram of intra prediction of a current block according to implementations of this disclosure.

FIG. 7 is a diagram of an intra prediction of a current block according to implementations of this disclosure. The diagram shows a portion of a frame 700 that includes the current block 702. The current block 702 is shown as an 8×8 block. However, any block size is possible. For example, the current block can have a size (i.e., dimensions of) 4×4, 8×8, 16×16, 32×32, or any other square or rectangular block size. The current block 702 can be a block of a current frame. In another example, the current frame may be partitioned into segments (such as the segments 308 of FIG. 3), tiles, or the like, each including a collection of blocks, where the current block is a block of the partition. For example, a current frame may be partitioned into four tiles (e.g., a top-left tile, a top-right tile, a bottom-left tile, and a bottom-right tile). Each tile includes blocks, at least some of which can be processed in accordance with this disclosure. The blocks of a tile can be of different sizes. For example, an 8×8 block can have an adjacent 16×16 left block. A tile, as used herein, refers to a frame or a partition of a frame. The blocks of a tile can be processed based on a scan order of the tile. The tiles can be processed based on a scan order of the frame.

In this example, the current block 702 is intra predicted using an intra-prediction mode having a prediction angle as illustrated by the directional lines 730. As indicated above, the prediction angle can be any angle between 0 and 360 degrees. The prediction mode uses pixels peripheral to the current block 702. Peripheral pixels are pixels that are outside of the current block 702 and within the current frame. The peripheral pixels can include one or more rows and columns adjacent to the current block 702. The peripheral pixels in FIG. 7 include first pixels 704 in a row and second pixels 706 in a column. The first pixels 704 include the eight horizontal pixels between pixels 708 and 710 (e.g., corresponding to the horizontal dimension of the 8×8 current block 702). The second pixels 706 include the eight vertical pixels between pixels 712 and 714 (e.g., corresponding to the vertical dimension of the 8×8 current block 702). The peripheral pixels can include a corner pixel 716, also referred to as a top-left pixel, which is at the intersection of the first pixels 704 and the second pixels 706.

The first pixels 704 are depicted above (i.e., on top of) the current block and the second pixels 706 are depicted to the left of the current block 702. However, this need not be the case. The horizontal pixels and the vertical peripheral pixels can be selected based on a scan order of the current tile. For example, in a raster scan order, the blocks of a tile may be processed, row-wise, from the top left block to the bottom right block. In a case where, for example, the scan order is from bottom right to top left, the first pixels (e.g., the horizontal peripheral pixels) may be below the current block and the second pixels (e.g., the vertical peripheral pixels) may be to the right of the current block. Zig-zag or other scan orders are also possible. In FIG. 7, the first pixels 704 are depicted as comprising one row of horizontal pixels and the second pixels 706 are depicted as comprising one column of vertical pixels. This need not be the case. The first pixels 704 can include one or more rows of pixels. The second pixels 706 can include one or more columns of pixels. The corner pixel 716 is a single top-left pixel, but could comprise more than one pixel and/or be located in a different position relative to the current block 702 in these alternative implementations.

Depending on the intra-prediction mode (i.e., the prediction angle), additional peripheral pixels may be used to perform the intra prediction. The number of additional pixels in the horizontal and/or vertical directions can be, but not need be, the same as the horizontal and/or vertical dimension of the current block 702, respectively.

The additional pixels can be previously decoded or predicted pixels, if available. For example, the second pixels 706 are depicted as including additional pixels 719. The additional pixels 719 can be the pixels of an adjacent and previously predicted or decoded block within the same tile as the current block 702.

The additional pixels can be extended pixels. Extended pixels can be used when neighboring pixels (i.e., pixels from an adjacent and previously predicted or decoded block) are not available for use. For example, neighboring pixels may not be available for use when a current block abuts (i.e., is adjacent to) a boundary (i.e., a vertical edge and/or a horizontal edge) of the current tile. As another example, neighboring pixels may not be available when a neighboring block that includes the needed pixels is not decoded or predicted before the current block.

Extended pixels can be derived from other adjacent peripheral pixels. Here, the first pixels 704 are depicted as including extended pixels 718 (indicated as shaded pixels). In an example, the extended pixels 718 can be derived by extending the value of the last (e.g., in the direction of the scan order) peripheral pixel value coincident with the horizontal dimension of the current block 702. For example, the value of each of the extended pixels 718 can be set to the value of the last pixel 710. In a left-to-right and top-to-bottom scan order, the last pixel 710 is the last non-extended pixel of the first pixels 704 because it is the right-most pixel in the left-to-right scan order, and the last pixel 722 is the last non-extended pixel of the second pixels 706 because it is the bottom-most pixel in the top-to-bottom scan order. While FIG. 7 depicts only extended horizontal pixels (i.e., extended pixels 718), extended vertical pixels are also possible. For example, if the additional pixels 719 were not available, then the second pixels 706 may include extended vertical pixels starting at pixel 720, if necessitated by the intra-prediction mode, that all use the value of the pixel 714 that is coincident with the vertical dimension of the current block 702.

In some arrangements and locations of a block, there are no pixels available for prediction along an edge. For example, a block may have no pixels adjacent to the top of the block, or may have no pixels to the left of the block. As can be determined from FIGS. 9A-10B, Zone 1 intra-prediction modes use only top reference pixels, Zone 3 intra-prediction modes use only left reference pixels, and Zone 2 intra-prediction modes use both the top and left reference pixels. Limiting intra-prediction modes to only those modes that rely on only available pixels is possible, but may result in reduced compression efficiency. Instead, where an above/top or left edge is unavailable, a pixel value may be copied from the other edge. The pixel value may be from the pixel closest (e.g., spatially nearest) to the unavailable edge. Using FIG. 7 by example, the pixel value of the pixel 712 may be used for horizontal pixels corresponding to the first pixels 704 and the extended pixels 718 and optionally for the top-corner pixel 716 when the row above the current block 702 is not available. Similarly, the pixel value of the pixel 708 may be used for vertical pixels corresponding to the second pixels 706 and the additional pixels 719 and optionally for the top-corner pixel 716 when the column to the left of the current block 702 is not available. This innovation avoids prediction discontinuities at tile boundaries, among other benefits.

The process 600 determines a filter to apply to the pixels peripheral to the current block 702 based on the prediction angle. In an example, a difference between a line perpendicular to the top edge (i.e., the horizontal edge) of the current block and the prediction angle is used to determine the filter. Stated differently, the filter may be determined based on a vertical line that is parallel to the left edge of the current block 702 and the prediction angle. Determining a filter can include determining a first filter for (i.e., to be applied to) the first pixels 704 and a second filter for the second pixels 706.

For example, the first filter to be applied to the first pixels 704 (i.e., the peripheral pixels above the current block), can be determined based on an angle delta 732. The angle delta 732 is the angle between a line 728 that is a vertical line parallel to the left edge of the current block 702 and the prediction angle indicated by the directional lines 730. The second filter can be determined based on an angle delta 734. The angle delta 734 is the angle between a horizontal line 726 that is parallel to the top edge of the current block 702 and the prediction angle indicated by the directional lines 730.

In an example, the angle delta 732 and the angle delta 734 can be calculated based on the prediction angle using the following formulas:

Angle delta 732=ABS(prediction angle−90)

Angle delta 734=ABS(prediction angle−180)

That is, for the first pixels 704 (e.g., peripheral pixels that are along a horizontal line), the angle delta 732 can be the absolute value of the difference between the prediction angle and 90 degrees; for the second pixels 706 (e.g., peripheral pixels that are along a vertical line), the angle delta 734 can be the absolute value of the difference between the prediction angle and 180 degrees.

In addition to the angle delta, the process 600 can determine the filter based on the size of the current block. The filter determined by the process 600 can be a low-pass n-tap filter. The variable n may be an odd integer. For example, a 3-tap filter is described below with respect to FIG. 8. However, other types of filters and filter sizes can be selected.

In some cases, the process 600 can determine a filter strength based on the angle delta and the block size. For example, Table 1 illustrates filter strengths based on an angle delta and the current block size, specifically, the dimension (i.e., the number or cardinality of whole pixels) of a block edge. The ranges of values for angle delta, the block edge dimensions, and the corresponding filter strengths can vary from the example shown in Table 1.

| | Block Edge Dimension | | | |
|---|---|---|---|---|
| Angle Delta | 4 | 8 | 16 | 32 |
| 0 | 0 | 0 | 0 | 0 |
| 1-3 | Up | 0 | 0 | 2 |
| 4-7 | Up | 0 | 1 | 2 |

| Angle Delta | Block Edge Dimension | | | |
|---|---|---|---|---|
| | 4 | 8 | 16 | 32 |
| 8-15 | Up | 1 | 1 | 2 |
| 16-31 | Up | 1 | 3 | 3 |
| 32-55 | Up | 3 | 3 | 3 |
| 56-89 | 1 | 3 | 3 | 3 |

Filters with increasing strengths (e.g., the modified pixel value receives a higher percentage of contribution from adjacent pixel values than the current pixel value) can be selected as the angle delta increases. For example, for a 16×16 block, when the angle delta is between 4 and 7, a filter of strength 1 can be selected, whereas a filter of strength 3 is selected when the angle delta is between 16 and 31. A filter strength of zero can indicate that no filter is to be selected (i.e., no filtering is to be performed). For an 8×8 block, filtering can start for angle deltas greater than 8. For a 16×16 block, filtering can start for angle deltas greater than 4. For 32×32 blocks, filtering can start for angle deltas greater than 0. A filter strength of zero can mean that the process 600 is to bypass filtering of the peripheral pixels (i.e., apply no filtering to the peripheral pixels).

As an illustration of using Table 1, assume that the current block is a 32×32 block and that the prediction mode is a vertical prediction mode (as described with respect to FIG. 10A). As such, the angle delta 732 is zero (i.e., ABS (90−90)). A delta value of zero, according to the first row of Table 1, results in a filter of zero strength. A filter of zero strength can correspond to no filtering. Therefore, when the prediction angle is 90 degrees, no filtering is performed on the first pixels (e.g., peripheral pixels that are above the current block). The angle delta 734 is 90 (i.e., absolute (180−90)). Even though Table 1 indicates a filter of strength 3 for an angle delta between (32, 90), the process 600 may not filter the second pixels (e.g., peripheral pixels that are to the left of the current block) because, as described with respect to FIG. 10A, the left pixels (i.e., J-R of FIG. 10A) are not required for the vertical intra-prediction mode.

As another example, assume that the current block is a 16×16 block and that the prediction mode has a prediction angle of 135 degrees as illustrated in FIG. 10B. As such, the value of the angle delta 732 (the angle delta for the first pixels above the current block) is 45 (i.e., ABS (135−90)) which results in a filter of strength 3. Correspondingly, the angle delta 734 (the angle delta for the second pixels to the left of the current block) is also 45 (i.e., ABS (135−180)) which also results in the filter of strength 3.

As yet another example, the process 600 can determine a filter when the angle delta is compared to a threshold. For example, a filter is not determined when the angle delta is greater than a threshold of 90 degrees. When a filter is not determined, filtering the peripheral pixels is bypassed. For example, assume the current block is an 8×8 block and that the prediction mode has a prediction angle of 195 degrees. As such, the value of the angle delta 732 (the angle delta for the first pixels above the current block) is 105 (i.e., ABS (195−90)). Table 1 indicates that where the angle delta is greater than 90, there is no entry for filtering. This result can indicate that the peripheral pixels corresponding to the calculated angle delta may not be used to generate the prediction block, as described above with respect to FIGS. 9A-9C. As such, filtering these pixels is unnecessary. Alternatively, even if the peripheral pixels are used to generate the prediction block, filtering may be bypassed when the angle delta is greater than the threshold (e.g., 90 degrees). In this example, the angle delta 734 (the angle delta for the second pixels to the left of the current block) is 15 (i.e., ABS (195−180)), which results in a filter of strength 1.

In some examples, no filter is selected for 4×4 blocks. In contrast, in the example of Table 1, a minimum prediction block size for certain angle deltas are processed by upsampling pixels along a prediction edge, as indicated by the entry "Up." In this example, the minimum prediction block size is 4×4 pixels. Use of upsampling for certain edges as described herein can improve the gain for the image data over that achievable using the other filtering described herein depending on the transform kernel used. An example of an upsampling filter is described below.

Determining a filter at 602 as described above includes determining a filter strength or type. By selecting a filter strength, a filter can be correspondingly determined. That is, each of the filter strengths or types can be associated with a respective filter. Each of the filter strengths or types above, together with a respective filter, can form a filter kernel. Examples of filters include a 3-tap filter with weights (1, 2, 1) and a 3-tap filter with weights (5, 6, 5). Other filters are possible. One possible set of filter kernels is included in Table 2 below.

| Filter Type/Strength | Filter |
|---|---|
| Up | (−1, 9, 9, −1) |
| 0 | Bypass |
| 1 | (1, 2, 1) |
| 2 | (5, 6, 5) |
| 3 | (2, 4, 4, 4, 2) |

According to this example, a filter strength of 1 corresponds to the (1, 2, 1) filter. A filter strength of 2 corresponds to the filter (5, 6, 5). A filter strength of 3 corresponds to the filter (2, 4, 4, 4, 2). A filter strength of zero indicates that no filtering is performed (i.e., filtering is bypassed). Alternatively, a filter strength of zero can correspond to a filter having weights (0, 1, 0). The upsampling filter is discussed in more detail below. Other filters are possible.

In another example, the filter strength can be further based on a quantization parameter that regulates the encoding bit rate and can be based on an activity measure (e.g., a variance value). A quantization parameter can be available for the current block (i.e., a block-level quantization parameter), for the current frame (i.e., a frame-level quantization parameter) that contains the current block, or both. A block-level quantization parameter can be encoded by an encoder in the block header and decoded by a decoder from the block header. A frame-level quantization parameter can be encoded by an encoder in the frame header and decoded by a decoder from the frame header. Where a block-level quantization parameter is not available, the frame-level quantization parameter can be used as the block-level quantization parameter. A relatively low quantization parameter can be indicative of more detail in the current frame (or current block, as the case may be) and a relatively high quantization parameter can be indicative of lower details in the current frame (or block). As such, the quantization parameter can be used to modulate the filter strength. For example, the strength of the filter can be proportional to the value of the quantization parameter. That is, weaker filtering can be applied for lower values of the quantization parameter and stronger filtering can be applied for higher values of the quantization parameter. In one application of this example, the filtering strength (and accordingly the filter)

determined by the angle delta(s) and/or the block size can be reduced by a value of one for values of the quantization parameter below a lower limit, and increased by a value of one for values of the quantization parameter above an upper limit. Variations of incorporating the quantization parameter into the filter selection, or into the application of the filter(s) to obtain modified values are possible.

The examples above describe different filters to filter the reference pixels along two edges of the block (e.g., the above and left edges). The same filter choices may be available to each edge, or each edge may have one or more filter choices different from those available to the other edge. The same or a different filter strength may be used for each edge. For example, a different angle delta does not have to be considered for selecting the filter for each edge. Instead, the angle delta of the dominant prediction edge (as indicated by the intra-prediction mode) may be used to select a single filter for both edges. That is, the larger angle delta is used. Using the angle delta of the dominant prediction edge may apply a stronger filter to the reference pixels of the other prediction edge than would occur if the other angle delta was used to determine the filter for that prediction edge. Other variations are possible. For example, instead of using the angle delta, absolute values of the intra-prediction angles may be compared to ranges of values to determine the filter.

While the process 600 can use Table 1 for filter selection for blocks having differing dimensions, the process 600 uses Table 1 for filter selection for square blocks only in some implementations. This is because Table 1 may be less effective for non-square blocks than for square blocks. An alternative implementation may use a combination of the dimensions of the block as an input to a table, instead of a block edge dimension. The combination of the dimensions of the block may be a sum of the height and width of the block, also called the prediction height and the prediction width herein. For example, the prediction height and prediction width may be specified in pixels.

Table 3 below is an example of such an alternative implementation.

|  | Prediction block width + height | | | | | | |
|---|---|---|---|---|---|---|---|
| Angle Delta | 8 | 12 | 16 | 24 | 32 | 48 | 64+ |
| 0 | 0 | 0 | 0 | 0 | 0 | 0 | 0 |
| 1-3 | Up | Up | Up | 0 | 1 | 3 | 3 |
| 4-7 | Up | Up | Up | 0 | 2 | 3 | 3 |
| 8-15 | Up | Up | Up | 1 | 2 | 3 | 3 |
| 16-19 | Up | Up | Up | 2 | 2 | 3 | 3 |
| 20-31 | Up | Up | Up | 2 | 2 | 3 | 3 |
| 32-39 | Up | Up | Up | 3 | 3 | 3 | 3 |
| 40-47 | 0 | 1 | 1 | 3 | 3 | 3 | 3 |
| 48-55 | 0 | 1 | 1 | 3 | 3 | 3 | 3 |
| 56-63 | 1 | 1 | 1 | 3 | 3 | 3 | 3 |
| 64-89 | 1 | 1 | 1 | 3 | 3 | 3 | 3 |

Table 4 below is another example of such an alternative implementation.

|  | Prediction block width + height | | | | | | |
|---|---|---|---|---|---|---|---|
| Angle Delta | 8 | 12 | 16 | 24 | 32 | 48 | 64+ |
| 0 | 0 | 0 | 0 | 0 | 0 | 0 | 0 |
| 1-3 | Up | 0 | 0 | 0 | 3 | 3 | 3 |
| 4-19 | Up | 0 | 0 | 3 | 3 | 3 | 3 |
| 20-31 | Up | 1 | 1 | 3 | 3 | 3 | 3 |
| 32-39 | Up | 1 | 1 | 3 | 3 | 3 | 3 |
| 40-47 | 1 | 1 | 1 | 3 | 3 | 3 | 3 |
| 48-55 | 1 | 2 | 2 | 3 | 3 | 3 | 3 |
| 56-63 | 1 | 2 | 2 | 3 | 3 | 3 | 3 |
| 64-89 | 2 | 2 | 2 | 3 | 3 | 3 | 3 |

Similarly to Table 1, the values of the angle delta, the prediction block dimensions, and the corresponding filter strengths in Tables 3 and 4 can vary from those shown. Although groupings of data reflecting the combinations of intra-prediction mode (as represented by angle delta) and prediction block size (as represented by the block edge dimension or the sum of the block width and height) as inputs and their associated filter strengths (or filters) as output are included in tables herein, any other arrangement or grouping that pairs the inputs and outputs is possible.

In some implementations, determining the filter at 602 can include determining the filter based on the prediction mode of at least one neighboring block to the current block. Determining the filter based on the prediction mode of at least one neighboring block may include determining the intra-prediction mode of one or more blocks to the left of the current block, one or more blocks above the current block, or one or more blocks to the left of and one or more blocks above the current block. Determining the filter based on the prediction mode of at least one neighboring block may further include using a first technique to determine the filter when a defined number of neighboring blocks uses a first prediction mode, and otherwise using a second technique to determine the filter. The first technique can include selecting a first filter from a first group of pairings of intra-prediction modes and prediction block size with a respective filter. The first group of pairings may be Table 3, for example. The second technique can include selecting a second filter from a second group of pairings of intra-prediction modes and prediction block size with a respective filter. The second group of pairings may be Table 4, for example.

The defined number of neighboring blocks can be one or more blocks. The prediction modes of the neighboring blocks considered may be intra-prediction modes. When the prediction mode of a neighboring block indicates that the current block is likely to benefit from greater filtering of the reference pixels, then a group of pairings using relatively strong filters may be selected. Otherwise, a group of pairings using relatively weaker filters may be selected. In an example, when one or more neighboring blocks is encoded using a prediction mode indicating that the block has a smooth gradient, the current block is likely to benefit from greater filtering. In the AV1 codec, such prediction modes include SMOOTH_PRED, SMOOTH_H_PRED, and SMOOTH_V_PRED intra modes. In this example, if either a block to the left of or a block above the current block, or both, use an intra-prediction mode from the group consisting of SMOOTH_PRED, SMOOTH_H_PRED, and SMOOTH_V_PRED, then the filter is determined using Table 4. Otherwise, the filter is determined using Table 3.

At 604, the process 600 filters, using the filter, the reference pixels. The filtering results in modified reference pixels, also referred to as modified pixels or modified edge pixels herein. Filtering is further described by reference to FIG. 8.

Figure 8:
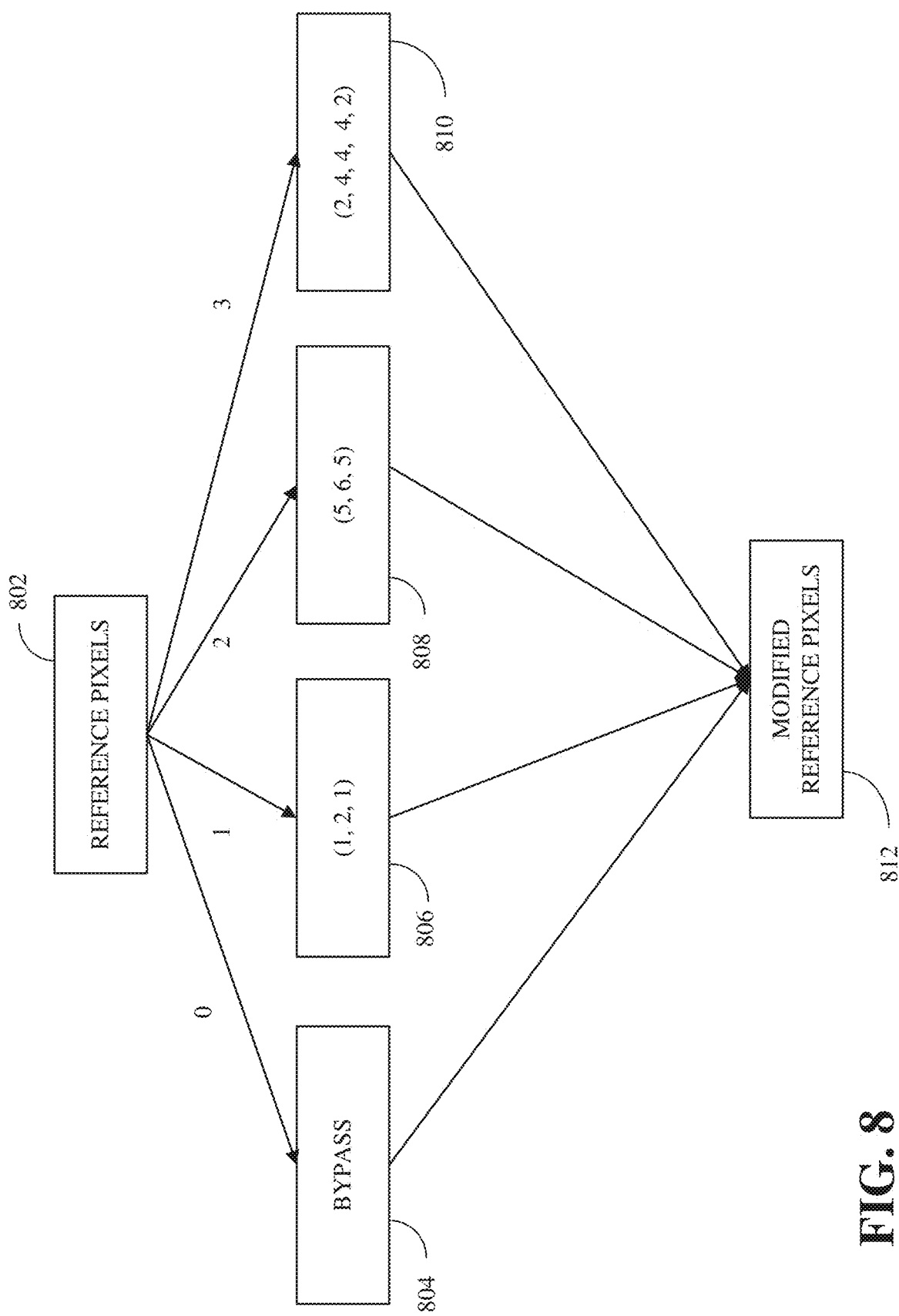
FIG. 8 is a diagram of an example of filtering peripheral pixels according to implementations of this disclosure.

FIG. 8 is a diagram of an example of filtering peripheral or reference pixels according to implementations of this disclosure. The diagram identifies peripheral pixels 802. The peripheral pixels 802 are filtered based on the filter and/or a filter strength determined by the process 600 at 602. The filtering results in modified pixels 812. The peripheral pixels 802 can be the first pixels 704 and/or the second pixels 706 of FIG. 7.

In the case of a filter strength of zero, the process 600 bypasses filtering at 804. That is, the process 600 does not perform filtering of the peripheral pixels. As such, the modified pixels 812 are the same as the peripheral pixels 802. When the filter strength is 1, the modified pixels 812 can result from applying, at 806, the 3-tap filter with weights (1, 2, 1) to the peripheral pixels. When the filter strength is 2, the 3-tap filter with weights (5, 6, 5) is applied to the peripheral pixels, at 808, to generate the modified pixels 812. When the filter strength is 3, the process 600 applies, at 810, the 5-tap filter with weights (2, 4, 4, 4, 2) to the peripheral pixels to generate the modified pixels 812. Alternatively, the 3-tap filter with weights (5, 6, 5) can be selected when the filter strength is 3.

In an implementation, a filter can be applied more than once based on the filter strength. For example, if the (5, 6, 5) filter is selected when the filter strength is equal to 3, that filter can be applied twice to obtain the modified pixels 812. That is, the filter is first applied to the peripheral pixels 802, resulting in intermediate pixels, and is then applied to the intermediate pixels to obtain the modified pixels 812.

An example of filtering, also called applying a filter herein, is now provided. In general, all edge predictors (also referred to herein as reference pixels) may be filtered. As described below, the upper-left pixel (such as pixel 716 in FIG. 7), extended samples (such as the extended pixels 718 in FIG. 7), and the last available above/top pixel (such as the pixel 710 in FIG. 7) and left pixel (such as the pixel 722 in FIG. 7) may not be filtered.

At 808, applying the (5, 6, 5) filter to the pixel 724 of FIG. 7 when the filter strength of 2 is performed as follows:

modified pixel 724=((5*pixel 714)+(6*pixel 724)+ (5*pixel 725)+8)/(5+6+5)

Filtering a pixel can use other adjacent pixels such that the pixel to be filtered is centered in the adjacent pixels. That is, for a filter of size n (i.e., an n-tap filter), the process 600 can use (n−1)/2 pixels on each side of the pixel to be predicted. For example, for a 3-tap filter, 1 (i.e., (3−1)/2) pixel can be used on each side of the pixel to be filtered. In the present example, the pixel 724 is centered between the pixel 714 and the pixel 725. When an insufficient number of adjacent pixels is available to filter a pixel, the process 600 can exclude filtering the pixel. For example, while pixel 722 has an above neighboring pixel 736, it does not have a below neighboring pixel. As such, the process 600 can exclude filtering of the pixel 722. In such a case, filtering the pixel 722 is bypassed as described with respect to 804. That is, the process 600 excludes from the filtering (i.e., bypasses) a peripheral pixel of the peripheral pixels when the peripheral pixels are a row above or below (or a column to the left or the right of) the current block and the peripheral pixel does not have at least (n−1)/2 adjacent left peripheral pixels or right peripheral pixels (or adjacent peripheral pixels above or below the peripheral pixel). In some implementations, if insufficient pixels are available, the first or last available pixel can be extended. For example, if pixel 708 is filtered with a 5-tap filter, the value of pixel 716 may be extended (also referred to as replicated) by one position to the left to create the required additional value.

Filtering of the pixel 710 can be bypassed. The pixel 710 has a left neighboring pixel 738. However, as the right neighboring pixel 740 is an extended pixel (meaning its value is the same as the pixel 710), the process 600 can bypass filtering of the pixel 710. Alternatively, the process 600 can filter the pixel 710 using the left neighboring pixel 738 and the right neighboring pixel 740 as described previously.

In an example, filtering a corner pixel, such as the corner pixel 716, can be bypassed. This pixel is not used in any of the Zone 1 or Zone 3 intra-prediction modes, so whether or not to bypass filtering a corner pixel may be based on the intra-prediction mode for the current block. For example, the corner pixel may be filtered when the intra-prediction mode is in Zone 2. The corner pixel can be filtered using adjacent first pixels and adjacent left pixels. For example, the corner pixel 716 can be filtered using pixel 708 (e.g., its adjacent horizontal pixel) and pixel 712 (e.g., its adjacent vertical pixel). Where the first pixels (such as the first pixels 704) form a horizontal row above the current block and the second pixels (such as the second pixels 706) form a vertical column to the left of the current block, the corner pixel 716 can be referred to as the upper-left pixel or top-left pixel as mentioned briefly above. It is possible that the corner pixel is filtered after the above and/or left edge reference pixels are filtered. It is more desirable if the corner pixel is filtered before any other pixels.

Although not shown in FIG. 8, in the case of a filter strength designated "Up", peripheral pixels 802 may be upsampled using an upsampling/upsample filter to produce the modified pixels 812. The upsampling filter may be a 2× upsample filter for a block edge having a length of four pixels. The filter can be used to interpolate 8 half-sample positions per edge. A 4-tap filter (−1, 9, 9, −1) may be used. Pseudo-code that can implement the upsampling for an edge follows, where edge[9] comprises the reference pixels along a first edge or along a second edge, upsample [i] comprises the upsampled value for the current pixel i, and upsample[8] comprises the modified pixels, such as the modified pixels 812.

edge[9]
↓
upsample[i] = round(9 * (edge[i] + edge[i+1] + edge[i−1] + edge[i+2]))
↓
upsample[8]

The function round ( ) may be more generally defined as round(x) (x+csum/2) /csum, where csum is the sum of the filter coefficients. When the upsampling filter is used, a clipping function may be applied to constrain the output value to the pixel range (e.g., 8, 10, or 12 bits). The clipping function may be applied as part of the round( )function. In the example of the upsampling filter described herein, the coefficient of −1 makes it possible for the filtered values to exceed the range.

At 606, the process 600 generates a prediction block for the current block using the intra-prediction mode and the modified reference pixels (such as the modified pixels 812 of FIG. 8).

As discussed above, multiple intra-prediction modes are available. The intra-prediction mode for the current block is preferably selected before the process 600 through a rate-distortion calculation that compares the bit cost (rate) of encoding the current block with some or all available intra- and inter-prediction modes with the errors (distortion in the reconstructed block as compared to the current block) resulting from encoding the current block using the respective prediction mode. The prediction mode selected for generating the prediction block is generally the prediction mode with the lowest rate-distortion value.

The multiple intra-prediction modes that are available include both directional/angular intra-prediction modes and intra-prediction modes that do not predict pixels according to an angle or direction. The process 600 describes steps that occur when the prediction mode determined is a directional/angular intra-prediction mode. In some implementations, only 8 directional/angular intra-prediction modes are available, including for example, those with prediction angles of 45, 63, 90, 117, 135, 153, 180, and 207 degrees. each of these base prediction angles may be associated with a respective base directional mode. In other implementations, additional directional/angular intra-prediction modes are available. For example, additional prediction angles may be supported by adding a delta parameter for each base directional mode. Additional prediction angles may be defined by:

> prediction angle=nominal_angle+
> (angle_delta*angle_step)

In this formulation, nominal_angle corresponds to the angle of a base directional mode, angle_delta is an integer within a defined range, and angle_step is an integer value. The variable angle_delta is different from the angle delta calculated as described above, and in an example angle_delta is in a predefined range of [−3, 3]. The variable angle_step may also be predefined. In an example where the variable nominal_angle is 90 degrees, the variable angle_delta is −2, and the variable angle_step is 3, the actual prediction angle for the intra-prediction mode is 90+(−2*3)=84 degrees. The use of additional directional modes may be disabled for certain block sizes. For example, blocks smaller than 8×8 pixels may not be allowed to use additional directional modes over any base directional modes. The variables angle_delta and angle_step may be defined such that more angles and hence more directional modes are available for larger blocks. For example, the predefined range of [−3, 3] for angle_delta and the value 3 for angle_step provides fifty-six angles. These values may be limited to a block size greater than or equal to 16×16 pixels. Fewer angles may be available to block sizes below 16×16 pixels in this example. One combination that results in fewer angles occurs when the variable angle_delta has a range of [−2, 2] and angle_step has a value of 4. This combination results in forty angles.

One example of pseudo-code that can be used to generate a prediction block is as follows. In this example, a 4×4 prediction block is generated (pred[16]) using the modified pixels 812 previously described.

```
edge[9], upsample[8], idx[16]
↓
pos = idx[i] >> 8
if (upsample_enabled) {
    sel0 = (idx[i] & 128) ? 1 : 0
    sel1 = !sel0
    frac = (idx[i] & 127) << 1;
} else {
    sel0 = sel1 = 0;
    frac = idx[i] & 255
}
pred[i] = round(left * (256-frac) + right * frac
↓
pred[16] (4x4 block)
```

When performed by an encoder, the process 600 can encode, in an encoded bitstream (such as the compressed bitstream 420 of FIG. 4), an indicator (e.g., one or more syntax elements) to apply the filter to reference pixels of the current block. The indicator may be encoded into a block, a frame, a slice, and/or a tile header. For example, the indicator may be encoded into the header of the residual block resulting from prediction of the current block. When performed by a decoder, the process 600 can decode from the encoded bitstream (e.g., the compressed bitstream 420 of FIG. 5), the indicator to apply the filter to reference pixels of the current block. For example, the indicator can identify one or more filters, filter strengths, filter weights, or a combination thereof. The indicator can signal that the decoder is to apply intra-prediction edge filtering. In such cases, the decoder can perform the process 600 to generate a prediction block for decoding the current residual decoded from the encoded bitstream that represents the current block. For example, the indicator can be a tile-level or a block-level parameter indicating to the decoder to modulate the filter strength. The decoder can use the quantization parameter to perform the modulation.

In addition to the indicator, the encoder may also encode into the bitstream the prediction mode used to predict the current block (e.g., at the intra/inter prediction stage 402) for use by the decoder to generate the prediction block (e.g., at the intra/inter-prediction stage 508) for decoding the current block. For example, the encoder can encode a second indicator of the base directional mode. Where additional directional modes are available to, and are used for prediction of, the current block, the encoder may also code the value for angle_delta within the defined range of values for angle_delta. The value may be coded into a header for the block (i.e., the header for the residual block), a slice in which the block is located, and/or the frame in which the block is located. Entropy coding angle_delta may be performed using a uniform and non-adapting probability model, also referred to as an adaptive probability model herein. In some implementations, this model may be replaced by a context model. The context model may, for example, vary dependent on the context of the intra-prediction mode (e.g., whether the current block is predicted using a directional prediction mode that is dominated by a vertical or horizontal angle, that is, whether the angle of the directional prediction mode is closer to 90 degrees or 180 degrees, respectively), and the relative use by other blocks of the intra-prediction modes. According to one implementation, the following code represents the context model (i.e., a non-uniform, adapting cumulative distribution function (cdf)) for entropy coding angle_delta:

> const aom_cdf prob
> default_angle_delta_cdf[DIRECTIONAL_MODES]
> [(2*MAX_ANGLE_DELTA+1]

where DIRECTIONAL_MODES is the number of base directional modes, here a constant of 8, and MAX_ANGLE_DELTA based on the available angle_delta values and is equal to 3 in this example.

In an example, the size of the context model is fifty-six words (which is equal to 8 base directional modes times 7 angle_delta values). The context adapts using previously-coded blocks. The context can be reset to a default cdf at the start of each key frame. The default cdf may be represented by a table of probabilities. One example of the default cdf is:

```
const aom_cdf_prob
default_angle_delta_cdf[DIRECTIONAL_MODES][2 * MAX_ANGLE_DELTA +1] =
{
{ AOM_ICDF(2340), AOM_ICDF(5327), AOM_ICDF(7611), AOM_ICDF(23102),
AOM_ICDF(27196), AOM_ICDF(30546), AOM_ICDF(32768), 0 },
{ AOM_ICDF(3267), AOM_ICDF(8071), AOM_ICDF(11970), AOM_ICDF(21822),
AOM_ICDF(25619), AOM_ICDF(30034), AOM_ICDF(32768), 0 },
{ AOM_ICDF(3417), AOM_ICDF(9937), AOM_ICDF(12286), AOM_ICDF(16420),
AOM_ICDF(19941), AOM_ICDF(30669), AOM_ICDF(32768), 0 },
{ AOM_ICDF(5167), AOM_ICDF(11735), AOM_ICDF(15254), AOM_ICDF(16662),
AOM_ICDF(20697), AOM_ICDF(28276), AOM_ICDF(32768), 0 },
{ AOM_ICDF(1728), AOM_ICDF(10973), AOM_ICDF(14103), AOM_ICDF(18547),
AOM_ICDF(22684), AOM_ICDF(27007), AOM_ICDF(32768), 0 },
{ AOM_ICDF(2764), AOM_ICDF(10700), AOM_ICDF(12517), AOM_ICDF(16957),
AOM_ICDF(20590), AOM_ICDF(30390), AOM_ICDF(32768), 0 },
{ AOM_ICDF(2407), AOM_ICDF(12749), AOM_ICDF(16527), AOM_ICDF(20823),
AOM_ICDF(22781), AOM_ICDF(29642), AOM_ICDF(32768), 0 },
{ AOM_ICDF(3068), AOM_ICDF(10132), AOM_ICDF(12079), AOM_ICDF(16542),
AOM_ICDF(19943), AOM_ICDF(30448), AOM_ICDF(32768), 0 }          };
```

The function AOM_ICDFO inverts the cdf so that it starts at 32768 and descends to 0 instead of starting at 0 and increasing up to 32768.

The aspects of encoding and decoding described above illustrate some encoding and decoding techniques. However, it is to be understood that encoding and decoding, as those terms are used in the claims, could mean compression, decompression, transformation, or any other processing or change of data.

The words "example" or "implementation" are used herein to mean serving as an example, instance, or illustration. Any aspect or design described herein as "example" or "implementation" is not necessarily to be construed as preferred or advantageous over other aspects or designs. Rather, use of the words "example" or "implementation" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of transmitting station 102 and/or receiving station 106 (and the algorithms, methods, instructions, etc., stored thereon and/or executed thereby, including by encoder 400 and decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of transmitting station 102 and receiving station 106 do not necessarily have to be implemented in the same manner.

Further, in one aspect, for example, transmitting station 102 or receiving station 106 can be implemented using a computer or processor with a computer program that, when executed, carries out any of the respective methods, algorithms and/or instructions described herein. In addition, or alternatively, for example, a special purpose computer/processor can be utilized which can contain other hardware for carrying out any of the methods, algorithms, or instructions described herein.

Transmitting station 102 and receiving station 106 can, for example, be implemented on computers in a video conferencing system. Alternatively, transmitting station 102 can be implemented on a server and receiving station 106 can be implemented on a device separate from the server, such as a hand-held communications device. In this instance, transmitting station 102 can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by transmitting station 102. Other transmitting station 102 and receiving station 106 implementation schemes are available. For example, receiving station 106 can be a generally stationary personal computer rather than a portable communications device and/or a device including an encoder 400 may also include a decoder 500.

Further, all or a portion of implementations of the present disclosure can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation so as to encompass all such modifications and equivalent structure as is permitted under the law.

What is claimed is:

1. A method for coding a current block using an intra-prediction mode, the intra-prediction mode comprising a prediction angle, the method comprising:
   determining, using the prediction angle and a size of the current block, a filter to apply to reference pixels peripheral to an edge of the current block from a set of available filters, wherein:
      for a block size of at least some block sizes, the set of available filters includes a first available filter and a second available filter for the block size, the first available filter and the second available filter having different non-zero filter strengths corresponding to different values for the prediction angle, and
      for at least a minimum block size, the set of available filters includes an upsampling filter associated with multiple prediction angles;
   filtering, using the filter, the reference pixels to generate modified reference pixels by, for respective current reference pixels of the reference pixels, filtering the current reference pixel using the filter and pixel values adjacent to the current reference pixel and peripheral to the edge of the current block; and
   generating a prediction block for the current block using the intra-prediction mode and the modified reference pixels.

2. The method of claim 1, wherein determining the filter comprises generating a difference between the prediction angle and a vertical line parallel to a left edge of the current block.

3. The method of claim 2, wherein determining the filter comprises:
   comparing the difference and the size to indices of a table, wherein each entry of the table comprises an identifier of a filter kernel; and
      determining the filter from the filter kernel of a first identifier responsive to the difference and the size corresponding to indices paired with the first identifier.

4. The method of claim 3, wherein the identifier comprises at least one of an identifier of one of a plurality of low-pass filters with different weights, an identifier to bypass filtering, or an identifier of the upsampling filter.

5. The method of claim 3, wherein the identifier comprises an identifier of the upsampling filter, and the upsampling filter is only available to intra-predicted blocks having a minimum prediction block size.

6. The method of claim 1, wherein the size of the current block comprises a cardinality of pixels forming an edge of the current block.

7. The method of claim 1, wherein the size of the current block comprises a sum of a height and a width of the current block.

8. The method of claim 1, wherein filtering the reference pixels comprises:
   filtering an above-left pixel of the reference pixels only when the intra-prediction mode uses an above-left pixel position.

9. The method of claim 1, further comprising:
   decoding, by a decoder and from an encoded bitstream, an indicator of whether to apply the filter to the reference pixels.

10. An apparatus for encoding or decoding a current block using an intra-prediction mode, the intra-prediction mode comprising a prediction angle, the apparatus comprising:
   a processor configured to:
   determine, using the prediction angle and a size of the current block, a filter to apply to reference pixels peripheral to the current block, wherein:
      the size of the current block corresponds to one of a plurality of block sizes, each of the plurality of block sizes is associated with a respective set of available filters,
      a first one of the sets includes a plurality of low-pass filters with different weights such that, for a block size associated with the first one of the sets, weights for a first low-pass filter of the plurality of low-pass filters are associated with a first range of values for the prediction angle and weights for a second low-pass filter of the plurality of low-pass filters are associated with a second range of values for the prediction angle, and
      a second one of the sets includes an upsampling filter and the first low-pass filter of the plurality of low-pass filters, wherein the upsampling filter is associated with multiple values for the prediction angle;
   filter, using the filter, the reference pixels to generate modified reference pixels; and
   generate a prediction block for the current block using the intra-prediction mode and the modified reference pixels.

11. The apparatus of claim 10, wherein the reference pixels comprise at least one of first pixels in a row above the current block or second pixels in a column left of the current block, and wherein to determine the filter comprises to:
   determine, using the prediction angle and a vertical line parallel to the column, a first filter for the first pixels and a second filter for the second pixels.

12. The apparatus of claim 10, wherein to determine a filter comprises to determine a filter strength, the filter strength identifying the filter.

13. An apparatus for encoding or decoding a current block using an intra-prediction mode, the intra-prediction mode comprising a prediction angle, the apparatus comprising:
   a first table stored in a memory that uses multiple prediction angles and multiple sizes for a block as indices for a respective entry comprising a first indicator of one of a plurality of available filter kernels;
   a second table stored in the memory that uses the multiple prediction angles and the multiple sizes as indices for a respective entry comprising a second indicator of one of the plurality of available filter kernels; and
   a processor configured to:
   determine, using the prediction angle and a size of the current block, a filter to apply to reference pixels peripheral to the current block, wherein:
      the size of the current block corresponds to one of a plurality of block sizes, each of the plurality of block sizes is associated with a respective set of available filters,
      a first one of the sets includes a plurality of low-pass filters with different weights such that, for a block size associated with the first one of the sets, weights for a first low-pass filter of the plurality of low-pass filters are associated with a first range of values for the prediction angle and weights for a second low-pass filter of the plurality of low-pass filters are associated with a second range of values for the prediction angle,
      a second one of the sets includes an upsampling filter and the first low-pass filter of the plurality of low-pass filters, and to determine the filter comprises:
         to use the first table to determine the filter responsive to at least one block adjacent to the current block having an intra-prediction mode within a defined proper subset of all available intra-prediction modes; and
         to otherwise use the second table to determine the filter.

14. The apparatus of claim 13, wherein the defined proper subset comprises SMOOTH_PRED, SMOOTH_H_PRED, and SMOOTH_V_PRED as defined by the AV1 codec.

15. The apparatus of claim 13, wherein an entry in the second table paired with a first prediction angle of the multiple prediction angles and a first size of the multiple sizes indicates a lesser level of filtering than an entry in the first table paired with the first prediction angle and the first size.

16. The apparatus of claim 10, wherein:
to determine the filter comprises to:
  determine a first filter using a first angle delta between the prediction angle and a first line parallel to a first edge of the current block and using the size of the current block; and
  determine a second filter using a second angle delta between the prediction angle and a second line parallel to a second edge of the current block that is orthogonal to the first edge;
to filter the reference pixels comprises to:
  filter, using the first filter, first pixels of reference pixels peripheral to the current block that are located in one of a row or a column adjacent to the current block to generate first modified reference pixels; and
  filter, using the second filter, second pixels of reference pixels peripheral to the current block that are located in the other of the row or the column adjacent to the current block to generate second modified reference pixels; and
to generate the prediction block comprises to:
  generate the prediction block for the current block using the intra-prediction mode, the first modified reference pixels, and the second modified reference pixels.

17. The apparatus of claim 16, wherein the first angle delta is an absolute value of a difference between the prediction angle and 90 degrees, the second angle delta is an absolute value of a difference between the prediction angle and 180 degrees, and the processor is configured to:
  filter a corner pixel at an intersection of the row and the column before generating the first modified reference pixels and the second modified reference pixels.

18. The apparatus of claim 16, wherein the prediction angle is one of a plurality of available prediction angles, the prediction angle equal to a constant multiplied by an integer in a defined range of values and added to a base prediction angle, and wherein the processor is configured to:
  decode, from an encoded bitstream, an indicator of the base prediction angle and the integer, the integer encoded using a non-uniform and adaptive probability model.

19. The method of claim 1, wherein determining the filter further comprises determining the filter using a quantization parameter of the current block such that weaker filtering is applied for lower values of the quantization parameter and stronger filtering is applied for higher values of the quantization parameter.

* * * * *